United States Patent
Takeda et al.

(10) Patent No.: US 12,175,320 B2
(45) Date of Patent: Dec. 24, 2024

(54) FOREIGN MATTER DETECTION DEVICE, CARD READER, FOREIGN MATTER DETECTION METHOD AND RECORDING MEDIUM PRELIMINARY

(71) Applicant: NIDEC INSTRUMENTS CORPORATION, Nagano (JP)

(72) Inventors: Hiroshige Takeda, Nagano (JP); Takeshi Segawa, Nagano (JP); Yasushi Kasahara, Nagano (JP); Takahiro Matsuzawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 18/365,223

(22) Filed: Aug. 4, 2023

(65) Prior Publication Data

US 2024/0054300 A1 Feb. 15, 2024

(30) Foreign Application Priority Data

Aug. 10, 2022 (JP) ................. 2022-128353

(51) Int. Cl.
- *G06K 7/00* (2006.01)
- *G06K 13/08* (2006.01)
- *G07F 19/00* (2006.01)

(52) U.S. Cl.
CPC ....... *G06K 7/0091* (2013.01); *G06K 13/0868* (2013.01); *G07F 19/2055* (2013.01)

(58) Field of Classification Search
CPC .............. G06K 7/0091; G06K 13/0868; G07F 19/2055

See application file for complete search history.

(56) References Cited

U.S. PATENT DOCUMENTS

| | | | |
|---|---|---|---|
| 9,754,462 B2* | 9/2017 | Wiesinger | G07F 19/2055 |
| 2007/0108278 A1* | 5/2007 | Masterton | G06K 13/08 |
| | | | 235/439 |
| 2012/0038773 A1 | 2/2012 | Priesterjahn et al. | |
| 2018/0040206 A1 | 2/2018 | Wiesinger et al. | |
| 2021/0034897 A1* | 2/2021 | Hosokawa | G09G 5/38 |
| 2022/0114351 A1* | 4/2022 | McGrath | G06K 7/0069 |

FOREIGN PATENT DOCUMENTS

| | | | | |
|---|---|---|---|---|
| JP | 2008027259 | | 2/2008 | |
| JP | 2008225670 | | 9/2008 | |
| JP | 2009116636 | | 5/2009 | |
| JP | 2014238643 | | 12/2014 | |
| WO | WO-2013065086 A1 * | | 5/2013 | G06K 7/0086 |

OTHER PUBLICATIONS

WO 2013065086A1—Magnetic Recording Medium Processing Device, 12 pages. (Year: 2024).*
"Office Action of Great Britain Counterpart Application", issued on Jan. 31, 2024, pp. 1-7.

* cited by examiner

*Primary Examiner* — Tuyen K Vo
(74) *Attorney, Agent, or Firm* — JCIPRNET

(57) ABSTRACT

A foreign matter detection device which detects a foreign matter in an inside of a card reader. The foreign matter detection device includes a control part which performs control for causing an imaging device provided in the inside of the card reader to image a space in the inside of the card reader, and a detection part which detects the foreign matter in the space by image analysis based on a captured image obtained by the imaging device.

8 Claims, 6 Drawing Sheets

FOREIGN MATTER DETECTION DEVICE, CARD READER, FOREIGN MATTER DETECTION METHOD AND RECORDING MEDIUM PRELIMINARY

CROSS REFERENCE TO RELATED APPLICATION

The present invention claims priority under 35 U.S.C. § 119 to Japanese Application No. 2022-128353 filed Aug. 10, 2022, the entire content of which is incorporated herein by reference.

TECHNICAL FIELD

At least an embodiment of the present invention may relate to a foreign matter detection device, a card reader, a foreign matter detection method and a recording medium that records a foreign matter detection program.

BACKGROUND

Conventionally, a card reader provided in a transaction terminal apparatus such as an ATM (Automated Teller Machine) has been known. Some types of card readers into which a magnetic card with a magnetic stripe is capable of being inserted have a space where a magnetic data swindle member (insert skimmer) is capable of being attached. A crime has increased that a magnetic data swindle member is inserted from a card insertion port and attached to an inside of a card reader and a third person swindles magnetic data of a magnetic card which has been inserted into the card reader.

In Japanese Patent Laid-Open No. 2008-027259 (Patent Literature 1), a suspicious object detection system is described in which a front panel of an ATM which is an object to be monitored is irradiated with an infrared pattern by an infrared pattern irradiation device from one side, and the front panel is photographed by an infrared radiation monitoring camera from the other side to acquire an image, and a difference between the image and an image photographed beforehand in a state that a suspicious object is not attached is measured and thereby, a suspicious object is detected.

In Japanese Patent Laid-Open No. 2008-225670 (Patent Literature 2), a skimming device detection system is described in which, in an imaging apparatus with an auto-focus control function which photographs an automatic cash transaction apparatus which is used in a financial institution and the like and a transaction operation face including a card insertion part of a card reader of the automatic cash transaction apparatus, when a skimming device is attached to a face of a card insertion part, or when a false transaction operation panel including a skimming device is attached to a transaction operation face, the imaging apparatus detects a variation of a focal distance to the skimming device and acquires the imaging distance information from an auto-focus control part which drives the auto-focus control function and, in a case that the imaging distance information is within a predetermined range, it is determined that a skimming device has been attached and an alarm signal is outputted.

In Japanese Patent Laid-Open No. 2009-116636 (Patent Literature 3), an automatic transaction apparatus is described in which a camera is installed on an upper part with respect to a money reception/payment port toward the money reception/payment port, a reflection member is attached to a surface of a money reception/payment port shutter, and an input operation part and a card insertion part are arranged in the vicinity of the money reception/payment port. As a result, respective units are arranged so as to obtain a camera optical axis capable of capturing an operator's face image and a skimming monitoring image of the card insertion part through the reflection member when the shutter is closed, and when the shutter is opened, an inner image of the money reception/payment port of the automatic transaction apparatus is photographed.

In Japanese Patent Laid-Open No. 2014-238643 (Patent Literature 4), a skimming prevention system is described in which, when a transaction start request is received, an ATM management information database is referred to identify the ATM, and a confirmation screen is created for requesting a user to confirm whether there is an abnormality in the ATM or not, and one or more partial images of the ATM are extracted, the extracted partial image is included in the confirmation screen and transmitted to the ATM, and continuation or discontinuation of processing of the transaction start request is determined depending on a determination of the user which is received as a response of the confirmation screen.

Magnetic data swindle members having various shapes have been already existed and, in the future, it is assumed that magnetic data swindle members having further new shapes will be used. However, in the existing card reader, it is difficult to detect magnetic data swindle members having various shapes which are attached and installed in the card reader with a high degree of accuracy.

For example, in a detection method by using a sensor or the like provided in the card reader assuming a specific shape of a magnetic data swindle member, it is difficult to detect magnetic data swindle members having various shapes, especially, a magnetic data swindle member having a new shape.

SUMMARY

At least an embodiment of the present invention may advantageously provide a foreign matter detection device, a card reader, a foreign matter detection method and a recording medium that records a foreign matter detection program which are capable of detecting foreign matters in various shapes in an inside of the card reader with a high degree of accuracy.

According to at least an embodiment of the present invention, there may be provided a foreign matter detection device which detects a foreign matter in an inside of a card reader. The foreign matter detection device includes a control part which performs control for causing an imaging device provided in the inside of the card reader to image a space in the inside of the card reader, and a detection part which detects the foreign matter in the space by image analysis based on a captured image obtained by the imaging device.

A card reader in accordance with an embodiment of the present invention includes the above-mentioned foreign matter detection device.

A foreign matter detection method in accordance with an embodiment of the present invention is a foreign matter detection method for detecting a foreign matter in an inside of the card reader. The foreign matter detection method includes performing control which causes an imaging device provided in the inside of the card reader to image a space in the inside of the card reader, and detecting the foreign matter in the space by image analysis based on a captured image obtained by the imaging device.

A non-transient computer-readable recording medium, recording a foreign matter detection program in accordance with an embodiment of the present invention, is provided for detecting a foreign matter in an inside of a card reader. The foreign matter detection program causes a processor to execute control which causes an imaging device provided in the inside of the card reader to image a space in the inside of the card reader, and execute detection of the foreign matter in the space by image analysis based on a captured image obtained by the imaging device.

Effects of the Invention

According to an embodiment of the present invention, a foreign matter detection device, a card reader, a foreign matter detection method and a recording medium that records a foreign matter detection program can be provided which are capable of detecting foreign matters in various shapes in an inside of the card reader with a high degree of accuracy.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
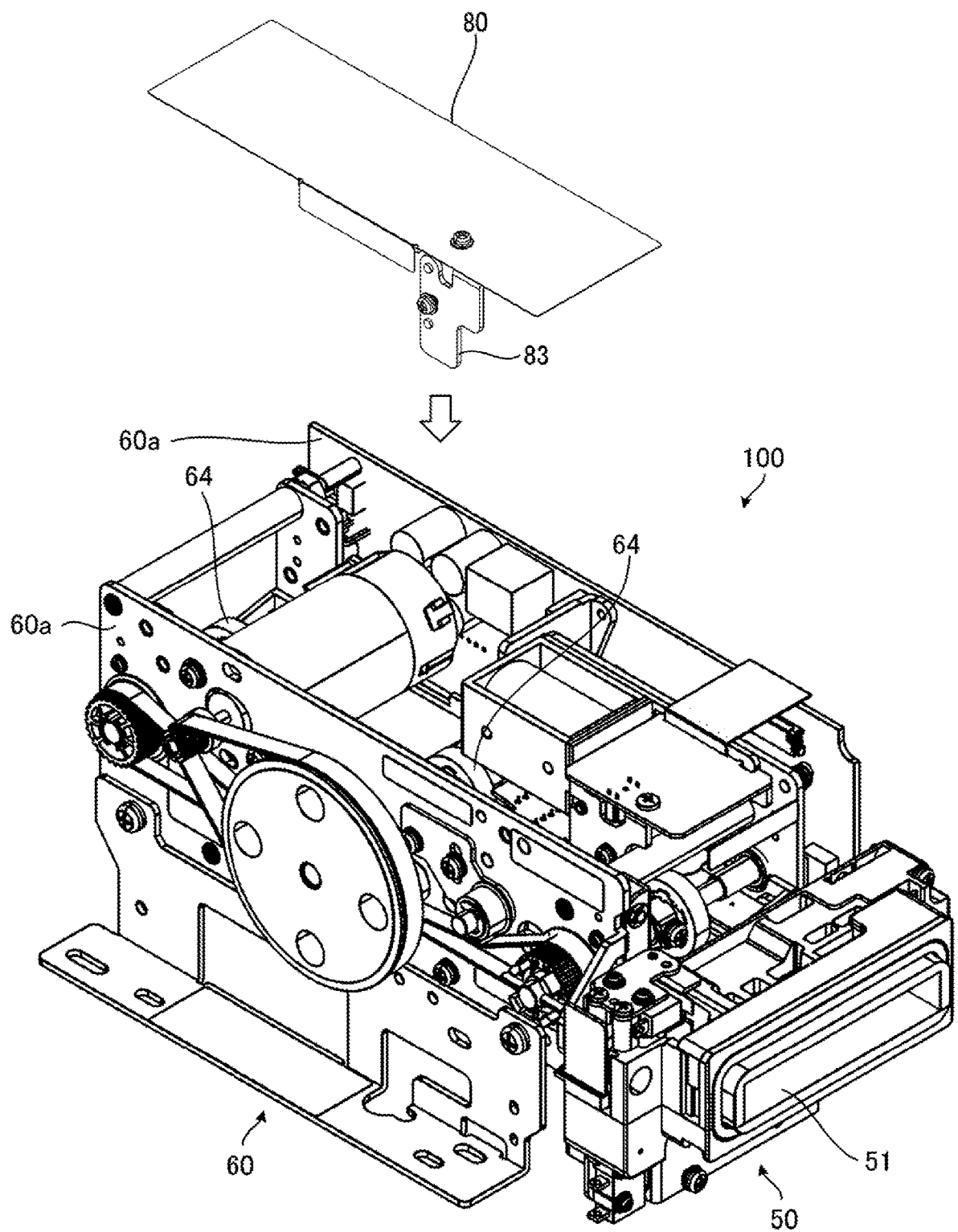
FIG. 1 is a perspective view showing a card reader 100 which is an example of a card reader in accordance with an embodiment of the present invention.
Figure 2:
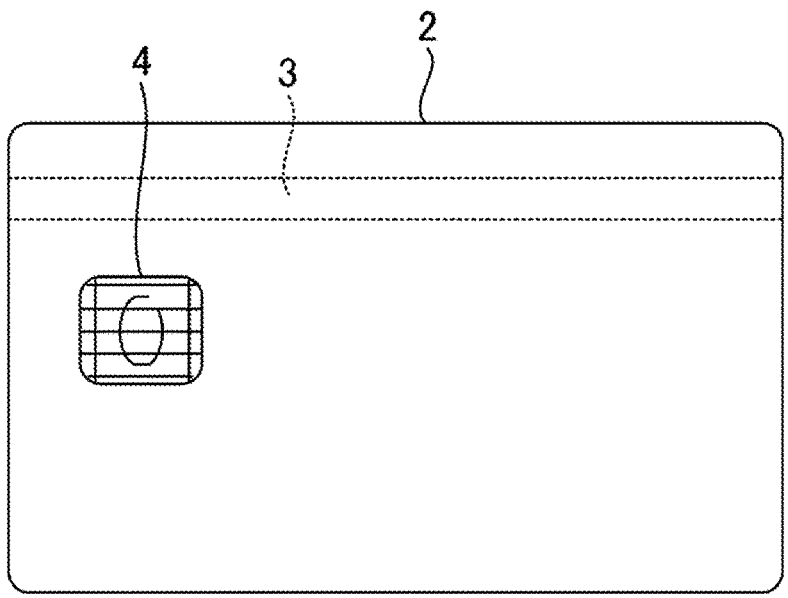
FIG. 2 is a view showing a magnetic card 2 which is an example of an object to be read by the card reader 100.
Figure 3:
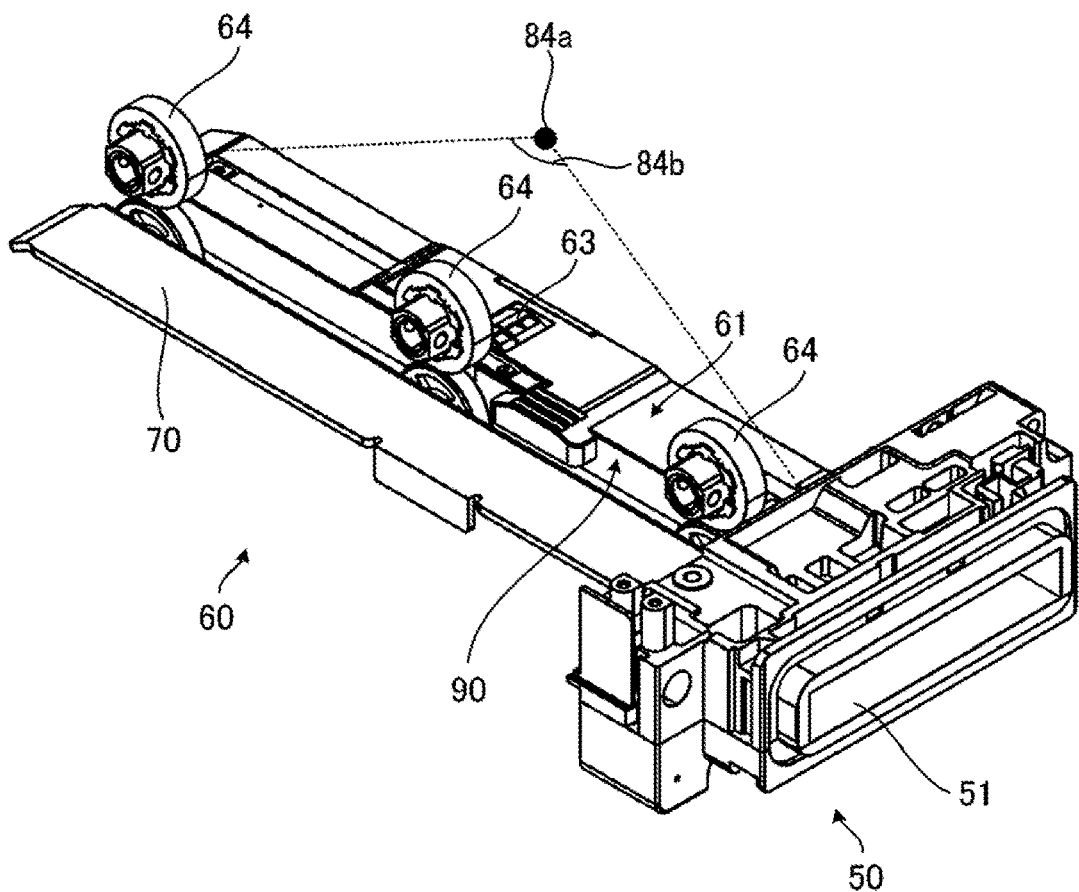
FIG. 3 is a perspective view showing an internal structure of the card reader 100.

An embodiment of the present invention will be described below with reference to the accompanying drawings.
Card Reader in this Embodiment FIG. 1 is a perspective view showing a card reader 100 which is an example of a card reader in accordance with an embodiment of the present invention. FIG. 2 is a view showing a magnetic card 2 which is an example of an object to be read by the card reader 100. FIG. 3 is a perspective view showing an internal structure of the card reader 100.

A card reader 100 is a device which performs at least one of reading of data recorded on a magnetic card 2 and writing of data to a magnetic card 2, and the card reader 100 is mounted on and used in a host apparatus (transaction terminal apparatus) such as an ATM or a POS (Point Of Sale).

As shown in FIG. 2, a magnetic card 2 is a rectangular-shaped card whose thickness is, for example, about 0.7-0.8 [mm]. A magnetic card 2 is formed of various card substrates corresponding to its application. The card substrates include plastic (for example, vinyl chloride), metal, paper and the like. A rear face (face on a back side in FIG. 2) of a magnetic card 2 is provided with a magnetic stripe 3. A magnetic stripe 3 is a strip of magnetic material, and magnetism is changed to store data (magnetic data). Further, an inside of the magnetic card 2 may be provided with an IC (Integrated Circuit) chip. In this case, a front face (face on a front side in FIG. 2) of the magnetic card 2 is provided with an IC contact 4 for communication with the IC chip.

As shown in FIGS. 1 and 3, the card reader 100 includes a card reader main body 60 and a card insertion part 50 (guide block) which is provided at a front end of the card reader main body 60. An inside of the card reader main body 60 is formed with a card conveyance passage 61 in which a magnetic card 2 inserted through the card insertion part 50 is conveyed.

The card reader main body 60 is provided with a magnetic head 63 for performing at least one of reading and writing of magnetic data from a magnetic card 2 having a magnetic stripe 3. Further, the card reader main body 60 may be provided with an IC contact block (IC contact block 62 in FIG. 5) which is contacted with an IC contact 4 of a magnetic card 2 to perform communication with an IC chip of the magnetic card 2. The magnetic head 63 and the IC contact block 62 are disposed at predetermined positions in the card conveyance passage 61.

The card reader main body 60 includes sensors (not shown) which detect a conveyance position of a magnetic card 2 in the card conveyance passage 61 and a card conveyance mechanism 64. The card conveyance mechanism 64 includes conveyance rollers, a motor and a drive force transmission mechanism which transmits rotation of the motor to the conveyance rollers. In this embodiment, three card conveyance mechanisms 64 are provided in the card conveyance passage 61, but only one motor for these card conveyance mechanisms 64 may be used.

The card insertion part 50 is provided with a card insertion port 51 and a card insertion path (not shown) into which a magnetic card 2 is inserted through the card insertion port 51. The card insertion path of the card insertion part 50 is connected with the card conveyance passage 61 of the card reader main body 60. The card insertion port 51 has a shape whose opening height is increased toward a front side of the device with a slit-shaped card insertion path which is extended in a straight line shape in a device width direction as a center. Further, although not shown, the card insertion part 50 includes a shutter for opening or closing the card insertion path, a shutter drive mechanism (shutter drive mechanism 56 in FIG. 5) for driving the shutter, and an insertion detection sensor (insertion detection sensor 55 in FIG. 5) for detecting insertion of a magnetic card 2 to the card insertion port 51.

A pad member 70 is provided along the card conveyance passage 61 in the inside of the card reader main body 60. Further, although not shown, the pad member 70 is formed with holes in a particular shape. The holes are, for example, a hole which is formed for attaching a specific module (for example, a card locking device for preventing pulling-out of a card which is detected as abnormality) in a space 90, a hole formed for sheet-metal processing when the pad member 70 is to be formed, and the like. The hole may be a through-hole or a hole having a bottom face.

Further, the card reader 100 has a space 90 where a magnetic data swindle member (insert skimmer) for swindling magnetic data of a magnetic card is capable of being attached between the magnetic head 63 and the card insertion part 50. The space 90 is, for example, a space which includes a region from the card insertion port 51 to the card conveyance passage 61 where a magnetic card 2 is passed and is larger than the region.

In a case that the space 90 is provided in an inside of the card reader 100, for example, it is conceivable that a magnetic data swindle member is inserted into the space 90 through the card insertion port 51, and the magnetic data swindle member having been inserted is fixed (positioned) to the card reader main body 60 by utilizing the hole of the pad member 70. Such a magnetic data swindle member is, for example, provided with a small magnetic head and a protruded part which is fitted to the pad member 70. When the magnetic data swindle member is fixed to an inside of the card reader main body 60 so that the protruded part of the magnetic data swindle member is fitted to the pad member 70, magnetic data of a magnetic card 2 which is conveyed along the card conveyance passage 61 can be read by the magnetic head of the magnetic data swindle member.

However, the magnetic data swindle member is not limited to this type. For example, it is conceivable that, without utilizing the hole of the pad member 70, in the card reader main body 60, a magnetic data swindle member is hooked to a space between the card insertion part 50 and the card reader main body 60 and attached and installed in the card reader main body 60.

An imaging module 80 shown in FIG. 1 is provided so as to cover an upper part of the card reader main body 60 and includes an imaging device 84 and light sources 85 and 86 described below (see, for example, FIG. 4). An imaging position 84*a* shown in FIG. 3 is a position where the imaging device 84 described below is provided. An imaging view angle 84*b* shown in FIG. 3 is a view angle of imaging by the imaging device 84 described below.

<Structure of Imaging Module 80>

Figure 4:
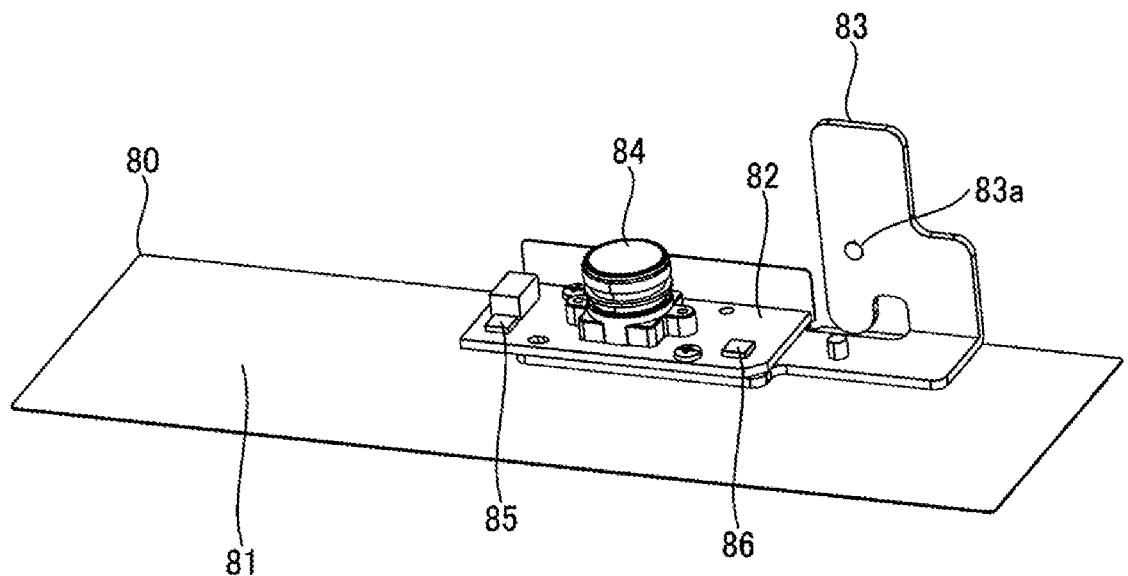
FIG. 4 is a perspective view showing an example of a structure of an imaging module 80.

FIG. 4 is a perspective view showing an example of a structure of the imaging module 80. As shown in FIG. 4, the imaging module 80 includes a cover member 81, a circuit board 82, a fixed member 83, the imaging device 84 and the light sources 85 and 86.

The cover member 81 is a plate-shaped member which covers an upper part of the card reader main body 60. The circuit board 82 and the fixed member 83 are provided on a face of the cover member 81 on an inner side of the card reader main body 60. The circuit board 82 is a circuit board for the imaging device 84 and the light sources 85 and 86.

The fixed member 83 is a member for fixing the imaging module 80 to the card reader main body 60. Specifically, the fixed member 83 has a screw hole 83*a* and is fixed to a wall part 60*a* of a housing of the card reader main body 60 by a screw fixed to the screw hole 83*a*.

When the imaging module 80 is fixed to the card reader main body 60, the imaging device 84 is mounted on the circuit board 82 at a position and in a direction so as to be capable of imaging the space 90 of the card reader 100 (at the imaging position 84*a* shown in FIG. 3). The imaging device 84 is, for example, an imaging device which uses an imaging element such as a CMOS (Complementary Metal Oxide Semiconductor) image sensor or a CCD (Charge Coupled Device) image sensor.

The light sources 85 and 86 are mounted on the circuit board 82 at positions and in directions so that lights can be irradiated to the space 90 of the card reader 100 when the imaging module 80 is fixed to the card reader main body 60. Each of the light sources 85 and 86 is, for example, an LED (Light Emitting Diode). In this embodiment, the light sources 85 and 86 are provided so as to interpose the imaging device 84. As a result, light is capable of being uniformly irradiated to an imaging range of the imaging device 84.

<Control Configuration of Card Reader 100>

Figure 5:
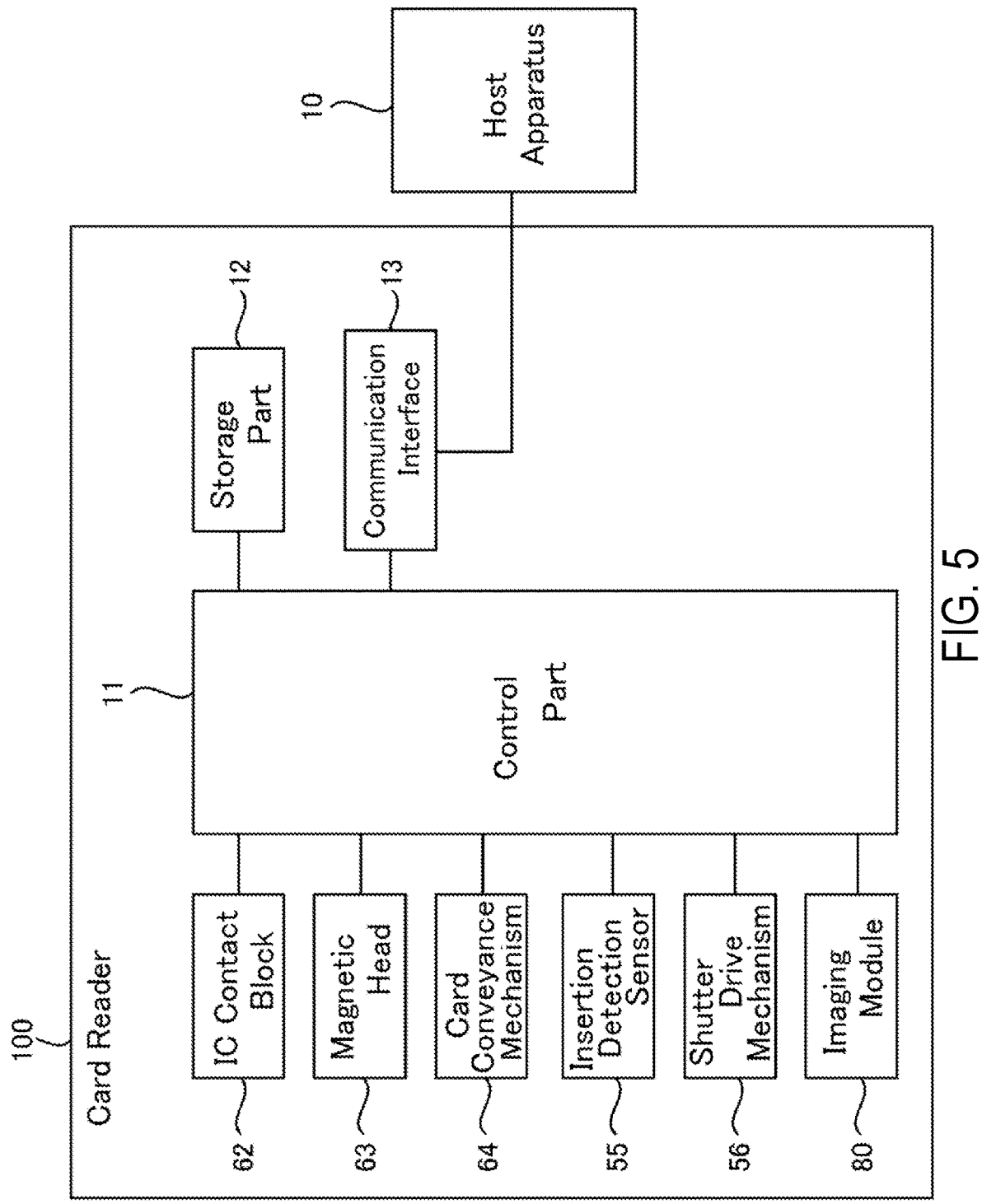
FIG. 5 is a view showing an example of a control configuration of the card reader 100.

FIG. 5 is a view showing an example of a control configuration of the card reader 100. As shown in FIG. 5, the card reader 100 includes, as a control configuration, a control part 11, the IC contact block 62, the magnetic head 63, the card conveyance mechanism 64, the insertion detection sensor 55, the shutter drive mechanism 56, a storage part 12 and a communication interface 13. In the control configuration of the card reader 100, each of the parts except the control part 11 is, for example, connected with the control part 11 through a dedicated bus or a connection line.

The control part 11 is configured of a control calculation means such as a CPU (Central Processing Unit) which controls respective parts of the card reader 100, peripheral circuits for controlling the respective parts and the like. Specifically, signals of various sensors including the insertion detection sensor 55 are inputted to the control part 11. The control part 11 controls the respective parts of the card reader 100 based on the signals of the sensors.

The storage part 12 is a recording medium which includes a ROM (Read Only Memory) in which various programs including a control program executed by the control part 11 and data are stored, a RAM (Random Access Memory) used as a working area for the control part 11, and the like. In this case, the ROM may be an EEPROM (Electrically Erasable Programmable Read Only Memory), a flash memory or the like.

Further, the control part 11 communicates with a host apparatus 10 on which the card reader 100 is mounted through the communication interface 13. The host apparatus 10 is a control device provided in a transaction terminal apparatus such as an ATM or a POS. The host apparatus 10 is an example of a foreign matter detection device in accordance with the present invention. The communication interface 13 is an interface for performing various communications with the host apparatus 10. The communication interface 13 is, for example, a USB (Universal Serial Bus) interface, an RS-232C interface or the like.

<Hardware Configuration of Host Apparatus 10>

Figure 6:
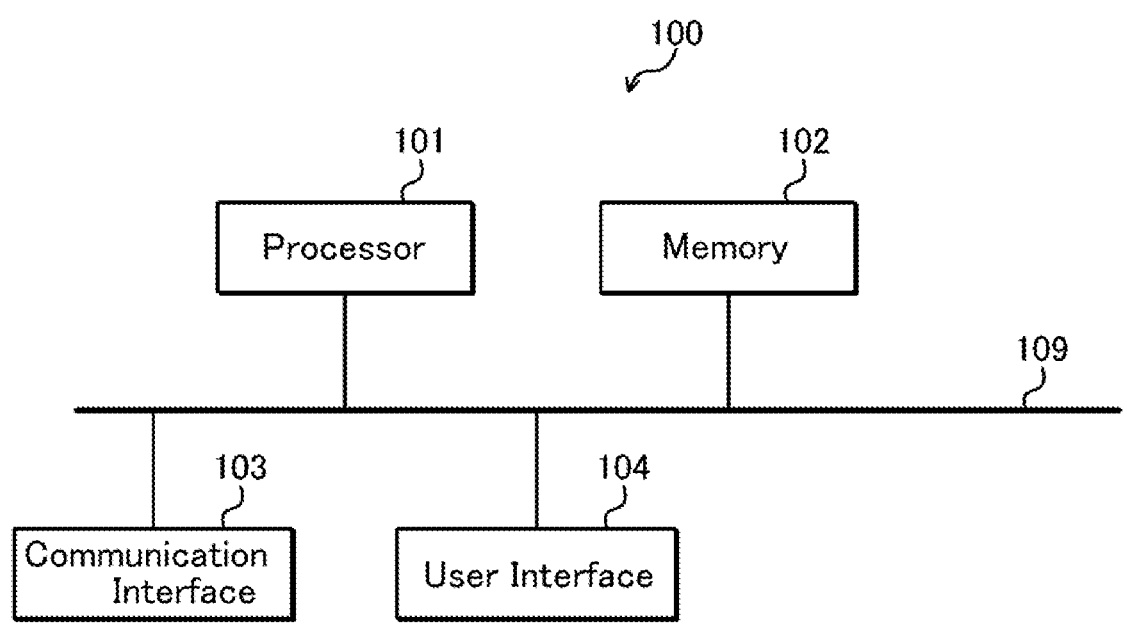
FIG. 6 is a view showing an example of a hardware configuration of a host apparatus 10.

FIG. 6 is a view showing an example of a hardware configuration of the host apparatus 10. The host apparatus 10 shown in FIG. 5 includes, for example, as shown in FIG. 6, a processor 101, a memory 102, a communication interface 103 and a user interface 104. The processor 101, the memory 102, the communication interface 103 and the user interface 104 are, for example, connected with each other by a bus 109.

The processor 101 is a circuit which performs signal processing and is, for example, a CPU which performs entire control of the host apparatus 10. In accordance with an embodiment of the present invention, the processor 101 may be realized by another digital circuit such as an FPGA (Field Programmable Gate Array) or a DSP (Digital Signal Processor). Further, the processor 101 may be realized by combining a plurality of digital circuits with each other.

The memory 102 includes, for example, a main memory and an auxiliary memory. The main memory is, for example, a RAM. The main memory is used as a work area for the processor 101.

The auxiliary memory is, for example, a nonvolatile memory such as a magnetic disk, an optical disk or a flash memory. Various programs for operating the host apparatus 10 are stored in the auxiliary memory. The program stored in the auxiliary memory is loaded to the main memory and executed by the processor 101.

Further, the auxiliary memory may include a portable memory which is detachable from the host apparatus 10. The portable memory includes a USB flash drive, a memory card such as an SD (Secure Digital) memory card, an externally attached hard disk drive and the like.

The communication interface 103 is a communication interface which performs wireless communication with other devices. The communication interface 103 includes, for example, a communication interface which communicates with the card reader 100 through the communication interface 13 of the card reader 100. As a communication interface which communicates with the card reader 100, for example, a USB interface or an RS-232C interface may be used. Further, the communication interface 103 may include a communication interface which is, for example, connected with a server (for example, a server of a financial institution) through a wide area network. The communication interface 103 is controlled by the processor 101.

The user interface 104 includes, for example, an input device which receives an operation input by a user, an output device which outputs information to the user, and the like. The input device can be, for example, realized by a pointing device, keys (for example, keyboard) or the like. The output device can be, for example, realized by a display, a speaker or the like. Further, the input device and the output device may be realized by a touch panel or the like. The user interface 104 is controlled by the processor 101.

A control part and a detection part of a foreign matter detection device in accordance with an embodiment of the present invention are, for example, configured by the processor 101 and the communication interface 103.

<Control by Host Apparatus 10>

Figure 7:
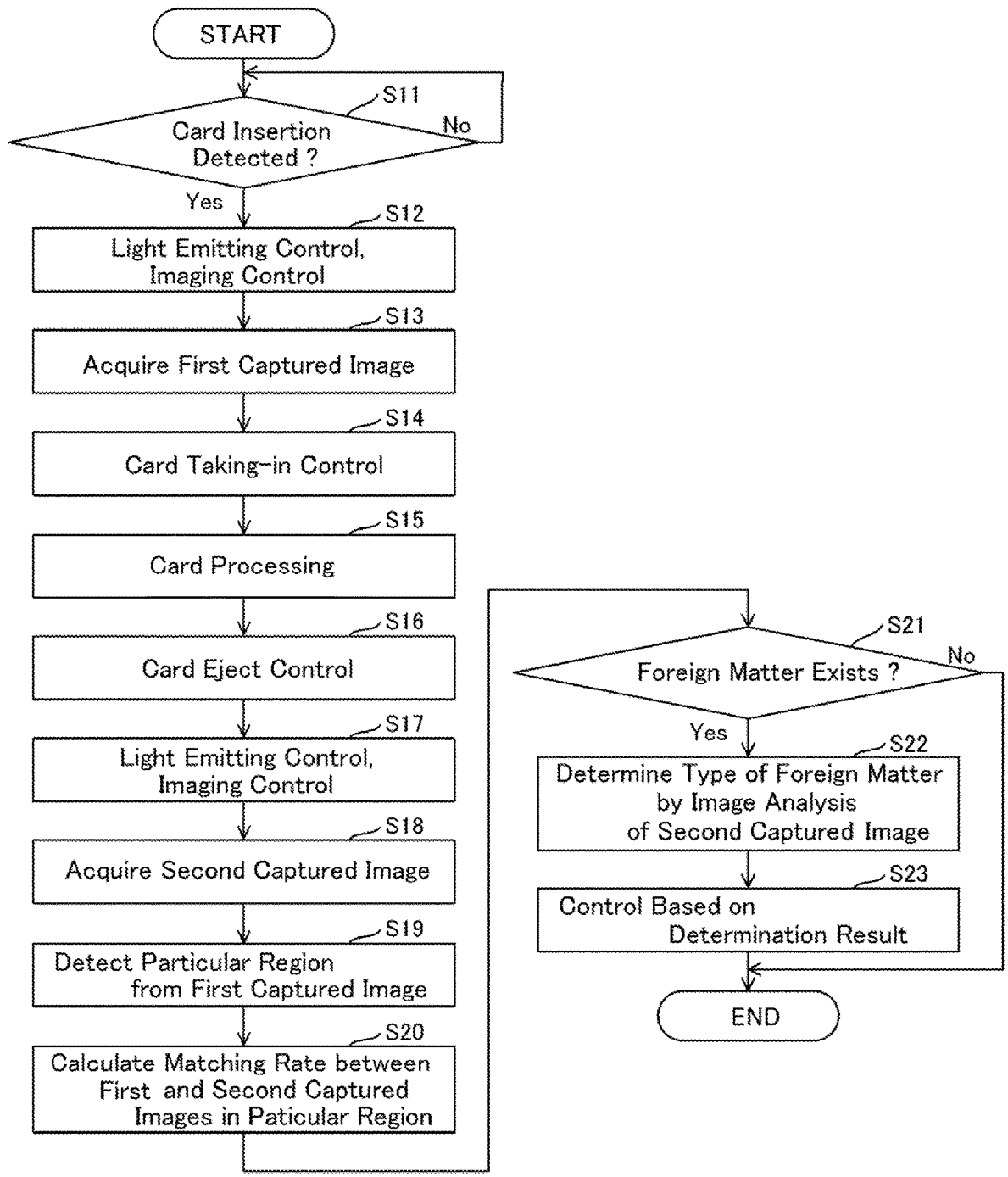
FIG. 7 is a flow chart showing an example of control by the host apparatus 10.

FIG. 7 is a flow chart showing an example of control by the host apparatus 10. The host apparatus 10 executes, for example, control shown in FIG. 7.

First, the host apparatus 10 determines whether insertion of a magnetic card 2 (card insertion) to the card insertion port 51 of the card reader 100 has been detected or not (step S11), and the host apparatus 10 waits until the card insertion is detected (step S11: loop of "No"). For example, the host apparatus 10 acquires a detection result of the insertion detection sensor 55 to perform determination of the step S11.

When the card insertion is detected in the step S11 (step S11: "Yes"), the host apparatus 10 performs light emitting control which causes the light sources 85 and 86 of the imaging module 80 to emit lights, and imaging control which causes the imaging device 84 of the imaging module 80 to execute imaging (step S12). Specifically, the host apparatus 10 synchronously performs the light emitting control and the imaging control so that the imaging device 84 images the space 90 at a timing that lights are irradiated from the light sources 85 and 86 to the space 90 by the light emitting control.

Next, the host apparatus 10 acquires a captured image obtained from the imaging device 84 by the imaging control in the step S12 as a first captured image (step S13). The first captured image which is acquired in the step S13 is an example of the first captured image which is obtained by imaging of the imaging device 84 at a first timing before a card taking-in operation of the card reader 100 is performed.

Next, the host apparatus 10 performs card taking-in control which causes the card reader 100 to execute a card taking-in operation in which a magnetic card 2 inserted through the card insertion part 50 is conveyed along the card conveyance passage 61 and thereby, the magnetic card 2 is taken into an inside of the card reader 100 (step S14). For example, the host apparatus 10 controls the shutter drive mechanism 56 to open a shutter of the card insertion part 50, controls the card conveyance mechanism 64 to convey the magnetic card 2 along the card conveyance passage 61 and take the magnetic card 2 into the inside of the card reader 100, and controls the shutter drive mechanism 56 to close the shutter of the card insertion part 50.

Next, the host apparatus 10 executes card processing (for example, electronic transaction processing) according to the magnetic card 2 having been taken (step S15). For example, the host apparatus 10 communicates with an IC chip of the magnetic card 2 by using the IC contact block 62 depending on an instruction received from a user through the user interface 104, and performs reading and writing of magnetic data from the magnetic card 2 by using the magnetic head 63 and, in this manner, the card processing in the step S15 is executed.

Next, the host apparatus 10 performs card eject control which causes the card reader 100 to execute a card eject operation in which the magnetic card 2 having been taken into the inside of the card reader 100 is conveyed along the card conveyance passage 61 to eject the magnetic card 2 from the card insertion part 50 (step S16). For example, the host apparatus 10 controls the shutter drive mechanism 56 to open the shutter of the card insertion part 50, controls the card conveyance mechanism 64 to convey the magnetic card 2 along the card conveyance passage 61 and eject the magnetic card 2 from the card insertion part 50, and controls the shutter drive mechanism 56 to close the shutter of the card insertion part 50.

Next, the host apparatus 10 performs light emitting control which causes the light sources 85 and 86 of the imaging module 80 to emit lights, and imaging control which causes the imaging device 84 of the imaging module 80 to execute imaging (step S17). The light emitting control and the imaging control in the step S17 are similar to the light emitting control and the imaging control in the step S12.

Next, the host apparatus 10 acquires a captured image obtained from the imaging device 84 by the imaging control in the step S17 as a second captured image (step S18). The second captured image which is acquired in the step S18 is an example of the second captured image which is obtained by imaging of the imaging device 84 at a second timing after the card eject operation of the card reader 100 has been performed.

Next, the host apparatus 10 detects a particular region in the space 90 where the hole having a particular shape exists from the first captured image acquired in the step S13 (step S19). The hole having a particular shape is, for example, a hole which is formed in the pad member 70.

In the step S19, the particular region in which the hole having a particular shape exists is, for example, detected as a pixel range in the captured image which is obtained by the imaging device 84. For example, the host apparatus 10 binarizes each pixel of the first captured image according to magnitude of a difference from a pixel value expressing an internal color of the hole having the particular shape, and a contour of the particular shape is detected from the first captured image in which each pixel is binarized to detect the particular region where the hole having the particular shape exists. The pixel value which expresses an internal color of the hole having a particular shape may be, for example, set in advance, or may be set by a user. In accordance with an embodiment of the present invention, processing in the step S19 may be executed between the step S13 through the step S18 instead of executing after the step S18.

Further, the host apparatus 10 may detect the particular region by excluding a region where a foreign matter such as an insert skimmer is unable to be entered and a region of an internal movable part of the card reader 100 from the captured image obtained by the imaging device 84. The excluding region is, for example, set in advance.

Next, the host apparatus 10 calculates a matching rate between the first captured image acquired in the step S13 and the second captured image acquired in the step S18 in the particular region which has been detected in the step S19 (step S20). Specifically, the host apparatus 10 calculates a matching rate based on comparison of pixel values between the particular region of the first captured image and the particular region of the second captured image.

For example, the host apparatus 10 determines to be "matching" when a difference between a pixel value of the first captured image and a pixel value of the second captured image among respective pixels of the particular region is less than a threshold and, in a case that a difference between a pixel value of the first captured image and a pixel value of the second captured image is equal to or more than the threshold, the host apparatus 10 determines to be "not matching". Further, the host apparatus 10 calculates a ratio of the pixels determined to be "matching" among the respective pixels of the particular region as a matching rate (matching degree).

Further, the host apparatus 10 may divide a captured image (first captured image and second captured image) obtained by the imaging device 84 into a plurality of cells (block) in an array shape or a matrix shape, and the matching rate is calculated in each of the cells overlapped with the particular region among the respective divided cells.

Next, the host apparatus 10 determines whether a foreign matter exists in the space 90 or not based on the matching rate calculated in the step S20 (step S21). For example, the host apparatus 10 determines that no foreign matter exists in the space 90 when the matching rate is not less than a predetermined value and, when the matching rate is less than the predetermined value, the host apparatus 10 determines that a foreign matter exists in the space 90.

Alternatively, in a case that a matching rate of each of the cells is calculated, the host apparatus 10 may determine whether a foreign matter exists in the space 90 or not based on the number of the cells whose matching rate is not less than the threshold, distribution (adjacent number) of the cells whose matching rate is not less than the threshold, or the like.

When it is determined that no foreign matter exists in the space 90 in the step S21 (step S21: "No"), the host apparatus 10 finishes a series of the processing. In a case that it is determined that a foreign matter exists in the space 90 (step S21: "Yes"), the host apparatus 10 determines a type of the foreign matter existing in the space 90 by image analysis of the second captured image acquired in the step S18 (step S22). For example, the host apparatus 10 determines a type of the foreign matter by inputting the second captured image (or, a portion of the particular region in the second captured image) into a learning model created by using machine learning (as an example, cascade classifier).

Next, the host apparatus 10 performs control based on a determination result in the step S22 (step S23), and a series of the processing is finished. For example, in a case that the host apparatus 10 determines that the foreign matter is an insert skimmer (magnetic data swindle member) in the step S22, the host apparatus 10 performs control that a magnetic card 2 is unable to be inserted into the card reader 100. This is control that, for example, even if card insertion is detected by the insertion detection sensor 55, the shutter of the card insertion part 50 is not opened.

Further, in a case that the host apparatus 10 determines that the foreign matter is a clip (object made of a bent wire or the like), a piece of paper, or the like which has a low risk and scarcely affects in operation of the card reader 100, the host apparatus 10 performs control that a magnetic card 2 can be inserted into the card reader 100. Further, in the step S23, the host apparatus 10 may output alert information indicating detection of the foreign matter in the space 90 and a type of the foreign matter having been determined to a manager of the host apparatus 10.

In accordance with an embodiment of the present invention, the processing of the steps S12 and S13 shown in FIG. 7 may be performed before the step S11, in other words, before a card insertion is detected. In this case, the processing of the step S19 may be also performed after the step S13 and before the step S11.

<Detection between Card Taking-in Control and Card Eject Control>

For example, the host apparatus 10 may perform light emitting control and imaging control which are similar to the steps S12 and S17 between the step S14 and the step S16 shown in FIG. 7, in other words, between the card taking-in control and the card eject control, and the host apparatus 10 performs image analysis based on a third captured image obtained by the imaging control to detect an insert skimmer, a jig for inserting the insert skimmer, and the like. In order to perform the image analysis, for example, a learning model created by using machine learning (as an example, cascade classifier) can be used.

Principal Effects in this Embodiment

As described above, according to the host apparatus 10 to which the foreign matter detection device in accordance with an embodiment of the present invention is applied, image analysis is performed based on a captured image obtained by the imaging device 84 which is provided in the card reader 100 and thus, foreign matters having various shapes (for example, insert skimmer) in an inside of the card reader 100 can be detected with a high degree of accuracy.

Further, in the host apparatus 10, a captured image before a card taking-in operation is performed and a captured image after a card eject operation has been performed are compared with each other and thus, an influence of a factor except installation of a foreign matter by utilizing a card taking-in operation (for example, change in an inside of the card reader 100 over time) is reduced, and a foreign matter can be detected with a high degree of accuracy.

Further, image analysis is limited to a region of a hole available for fixing an insert skimmer and thus, an influence of a region where a probability of presence of an insert skimmer is low is reduced and an insert skimmer can be detected with a high degree of accuracy. Further, a region in a particular shape where a hole has a particular shape is detected by image analysis and thus, an insert skimmer for various card readers 100 which are mounted on the host apparatus 10 can be detected with a high degree of accuracy.

Further, the host apparatus 10 causes the light sources 85 and 86 to emit light at an imaging time by the imaging device 84 provided in the inside of the card reader 100 and thus, even when an inside of the card reader 100 is dark, a clear captured image can be acquired and a foreign matter can be detected with a high degree of accuracy. Further, also in a case that a foreign matter is, for example, a magnetic data swindle member and, even if a member such as a transparent member which is difficult to be imaged is used as a magnetic data swindle member, when light is irradiated and imaged, a clear captured image of the magnetic data swindle member can be acquired by utilizing the reflected light and thus, the foreign matter can be detected with a high degree of accuracy.

Further, in the host apparatus 10, the light sources 85 and 86 provided in the inside of the card reader 100 are irradiated only at an imaging time by the imaging device 84 and thus, a time period of the light for imaging which leaks outside the card reader 100 can be shortened. As a result, for example, light emission incomprehensible for a user and light emission which obstructs a guide and the like by other light emitting parts can be restrained.

Further, when respective captured images obtained by the imaging device 84 are stored in a memory, the captured images can be utilized as an image log which indicates at which time and what kind of abnormality has occurred.

First Modified Embodiment

In the embodiment described above, the imaging module 80 includes two light sources (light sources 85 and 86). However, the imaging module 80 may include one light source, or three or more light sources.

Second Modified Embodiment

In the embodiment described above, imaging control of the imaging device 84 is performed at specific timings, for example, before a card taking-in operation is performed and after a card eject operation has been performed to acquire still images. However, the host apparatus 10 may cause the imaging device 84 to acquire a moving image. For example, the host apparatus 10 may cause the imaging device 84 to start moving image capturing after card insertion to the card insertion part 50 is detected in the step S11 in FIG. 7. In this case, the host apparatus 10 may perform image analysis based on a moving image obtained by moving image capturing, or may perform image analysis by acquiring still images at specific timings, for example, before a card taking-in operation is performed and after a card eject operation has been performed from a moving image obtained by the moving image capturing.

Third Modified Embodiment

In the embodiment described above, the light sources 85 and 86 are irradiated at a timing of imaging by the imaging device 84. However, the host apparatus 10 may cause the light sources 85 and 86 to continuously emit light during a time period including an imaging timing by the imaging device 84. For example, the host apparatus 10 may cause the light sources 85 and 86 to continuously emit light during a time period between the step S12 through the step S17 in FIG. 7.

Fourth Modified Embodiment

In the embodiment described above, the foreign matter detection device in accordance with an embodiment of the present invention is applied to the host apparatus 10. However, the foreign matter detection device in accordance with an embodiment of the present invention may be applied to the card reader 100. In this case, the control part and the detection part of the foreign matter detection device in accordance with an embodiment of the present invention are, for example, configured in the control part 11 shown in FIG. 5.

Fifth Modified Embodiment

In the embodiment described above, for example, a hole in a particular shape provided in the pad member 70 is described. However, instead of a hole in a particular shape, a cut-out part, a step, a protrusion, a recess and the like may be conceivable as a portion which is available for attaching a magnetic data swindle member.

<Foreign Matter Detection Program>

The foreign matter detection method described in the above-mentioned embodiment can be realized by executing a foreign matter detection program which is previously prepared in a computer. The foreign matter detection program is recorded in a storage medium which is readable by a computer and is executed by reading out from the storage medium. Further, the foreign matter detection program may be provided in a form stored in a non-transitory storage medium such as a flash memory, or may be provided over a network such as the Internet. The computer which executes the foreign matter detection program may be included in the foreign matter detection device, may be included in an electronic device such as a smart phone, a tablet terminal or a personal computer which is capable of communicating with the foreign matter detection device, or may be included in a server device which is capable of communicating with the foreign matter detection device or the electronic device.

As described above, the following embodiments are disclosed in the present specification.

(1) A foreign matter detection device which detects a foreign matter in an inside of a card reader, the foreign matter detection device including a control part which performs control for causing an imaging device provided in the inside of the card reader to image a space in the inside of the card reader, and a detection part which detects the foreign matter in the space by image analysis based on a captured image obtained by the imaging device.

According to the above-mentioned configuration (1), image analysis is performed based on a captured image which is obtained by the imaging device provided in the inside of the card reader and thus, foreign matters in various shapes in the inside of the card reader can be detected with a high degree of accuracy.

(2) The foreign matter detection device which is described in the above-mentioned configuration (1), where the space is a space to which a magnetic data swindle member for swindling magnetic data of a magnetic card is capable of being attached, and the foreign matter includes the magnetic data swindle member.

According to the above-mentioned configuration (2), magnetic data swindle members in various shapes in the inside of the card reader can be detected with a high degree of accuracy.

(3) The foreign matter detection device which is described in the above-mentioned configuration (2), where a hole which is available for fixing of the magnetic data swindle member exists in the space, the detection part detects a region of the hole in the captured image, and the foreign matter is detected by image analysis of the region having been detected.

According to the above-mentioned configuration (3), image analysis is performed in a limited region of the hole which is available for fixing of the magnetic data swindle member and thus, influence of a region where likelihood that a magnetic data swindle member exists is low is reduced and the magnetic data swindle member can be detected with a high degree of accuracy.

(4) The foreign matter detection device which is described in one of the above-mentioned configurations (1) through (3), where the control part causes the imaging device to image the space at a first timing before a card taking-in operation of the card reader and at a second timing after a card eject operation of the card reader performed after the card taking-in operation, and the detection part detects the foreign matter based on a comparison between a first captured image which is obtained by imaging of the imaging device at the first timing and a second captured image obtained by the imaging of the imaging device at the second timing.

According to the above-mentioned configuration (4), captured images before a card taking-in operation and after a card eject operation are compared with each other and thus, influence by factors (change over time and the like) except installation of a magnetic data swindle member by utilizing a card taking-in operation is reduced and the magnetic data swindle member can be detected with a high degree of accuracy.

(5) The foreign matter detection device which is described in one of the above-mentioned configurations (1) through (4), where the inside of the card reader is provided with a light source which is capable of emitting light to the space, and the control part performs control which causes the light source to emit light at an imaging time by the imaging device.

According to the above-mentioned configuration (5), the light source provided in the inside of the card reader is irradiated at an imaging time by the imaging device and thus, even when the inside of the card reader is dark, a clear captured image can be obtained and the foreign matter can be detected with a high degree of accuracy. Further, for example, in a case that a foreign matter is a magnetic data swindle member and, even when a member such as a transparent member which is difficult to be imaged is used as the magnetic data swindle member, when light is irradiated and imaging is performed, a clear captured image of the magnetic data swindle member can be acquired by utilizing the reflected light and thus, the foreign matter can be detected with a high degree of accuracy.

(6) The foreign matter detection device which is described in one of the above-mentioned configurations (1) through (5), where
in a case that the detection part detects the foreign matter, the detection part discriminates the foreign matter by image analysis based on the captured image.

According to the above-mentioned configuration (6), control can be performed according to a type of the foreign matter in the inside of the card reader. For example, in a case that the foreign matter in the inside of the card reader is a magnetic data swindle member, control for preventing insertion of a new magnetic card to the card reader is, for example, performed so as to be capable of preventing swindle of magnetic data of the magnetic card. Further, in a case that the foreign matter in the inside of the card reader is not a magnetic data swindle member, for example, control for accepting insertion of a new magnetic card to the card reader is performed and an operation of the card reader can be continued.

(7) A card reader which includes the foreign matter detection device described in one of the above-mentioned configurations (1) through (6).

According to the above-mentioned configuration (7), image analysis is performed based on a captured image which is obtained by the imaging device provided in the inside of the card reader and thus, foreign matters in various shapes in the inside of the card reader can be detected with a high degree of accuracy.

(8) A foreign matter detection method for detecting a foreign matter in an inside of the card reader, the foreign matter detection method including performing control which causes an imaging device provided in the inside of the card reader to image a space in the inside of the card reader, and detecting a foreign matter in the space by image analysis based on a captured image obtained by the imaging device.

According to the above-mentioned method (8), image analysis is performed based on a captured image which is obtained by the imaging device provided in the inside of the card reader and thus, foreign matters in various shapes in the inside of the card reader can be detected with a high degree of accuracy.

(9) A non-transient computer-readable recording medium, recording a foreign matter detection program for detecting a foreign matter in an inside of a card reader, the foreign matter detection program causing a processor to execute control which causes an imaging device provided in the inside of the card reader to image a space in the inside of the card reader, and execute detection of a foreign matter in the space by image analysis based on a captured image obtained by the imaging device.

According to the above-mentioned program (9), image analysis is performed based on a captured image which is obtained by the imaging device provided in the inside of the card reader and thus, foreign matters in various shapes in the inside of the card reader can be detected with a high degree of accuracy.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A foreign matter detection device which detects a foreign matter in an inside of a card reader, the foreign matter detection device comprising:
   a control part which performs control for causing an imaging device provided in the inside of the card reader to image a space in the inside of the card reader; and
   a detection part which detects the foreign matter in the space by image analysis based on a captured image obtained by the imaging device, wherein
   the control part causes the imaging device to image the space at a first timing before a card taking-in operation of the card reader and at a second timing after a card eject operation of the card reader performed after the card taking-in operation, and
   the detection part detects the foreign matter based on a comparison between a first captured image which is obtained by imaging of the imaging device at the first timing and a second captured image obtained by the imaging of the imaging device at the second timing, wherein the second captured image is obtained after the first captured image.

2. The foreign matter detection device according to claim 1, wherein
the space is a space to which a magnetic data swindle member for swindling magnetic data of a magnetic card to be attached, and
the foreign matter comprises the magnetic data swindle member.

3. The foreign matter detection device according to claim 2, wherein
a hole which is available for fixing of the magnetic data swindle member exists in the space,
the detection part detects a region of the hole in the captured image, and
the foreign matter is detected by image analysis of the region having been detected.

4. The foreign matter detection device according to claim 1, wherein
the inside of the card reader is provided with a light source configured to emit light to the space, and
the control part performs control which causes the light source to emit light at an imaging time by the imaging device.

5. The foreign matter detection device according to claim 1, wherein in a case that the detection part detects the foreign matter, the detection part discriminates the foreign matter by image analysis based on the captured image.

6. A card reader comprising the foreign matter detection device defined in claim 1.

7. A foreign matter detection method for detecting a foreign matter in an inside of a card reader, the foreign matter detection method comprising:
performing control which causes an imaging device provided in the inside of the card reader to image a space in the inside of the card reader;
detecting the foreign matter in the space by image analysis based on a captured image obtained by the imaging device;
causing the imaging device to image the space at a first timing before a card taking-in operation of the card reader and at a second timing after a card eject operation of the card reader performed after the card taking-in operation; and
detecting the foreign matter based on a comparison between a first captured image which is obtained by imaging of the imaging device at the first timing and a second captured image obtained by the imaging of the imaging device at the second timing, wherein the second captured image is obtained after the first captured image.

8. A non-transient computer-readable recording medium, recording a foreign matter detection program for detecting a foreign matter in an inside of a card reader, the foreign matter detection program causing a processor to execute:
control which causes an imaging device provided in the inside of the card reader to image a space in the inside of the card reader;
detection of the foreign matter in the space by image analysis based on a captured image obtained by the imaging device;
control which causes the imaging device to image the space at a first timing before a card taking-in operation of the card reader and at a second timing after a card eject operation of the card reader performed after the card taking-in operation; and
detection of the foreign matter based on a comparison between a first captured image which is obtained by imaging of the imaging device at the first timing and a second captured image obtained by the imaging of the imaging device at the second timing, wherein the second captured image is obtained after the first captured image.

* * * * *